Dec. 18, 1923.
W. K. LEWIS
1,477,886
BELT AND THE LIKE
Filed Aug. 28, 1918
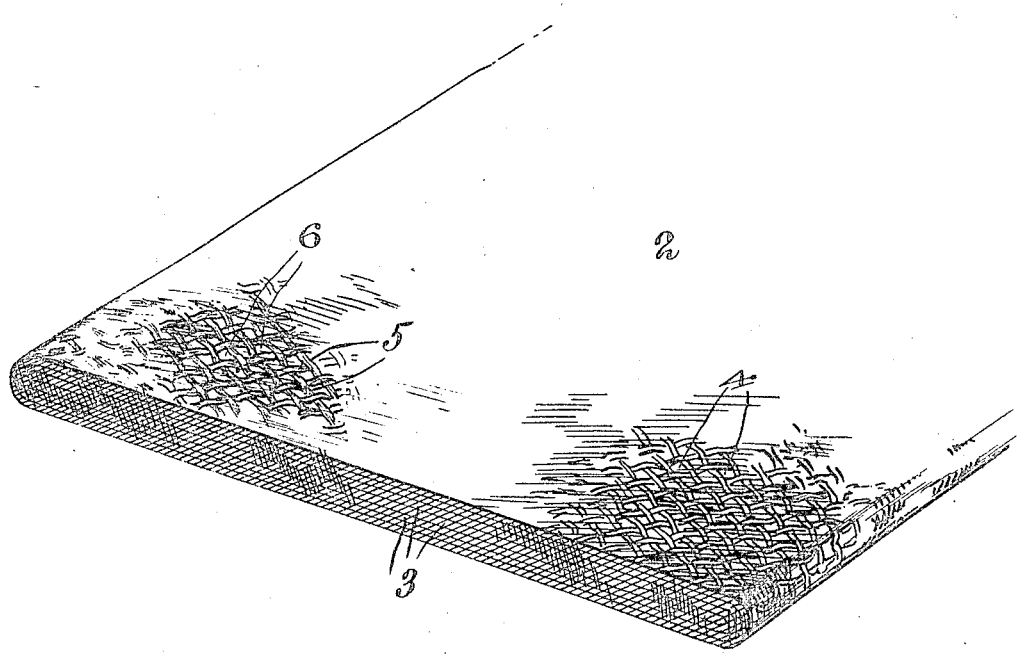
Inventor
Warren K. Lewis.
By
his Attorney.

Patented Dec. 18, 1923.

1,477,886

UNITED STATES PATENT OFFICE.

WARREN K. LEWIS, OF NEWTON, MASSACHUSETTS, ASSIGNOR TO THE GOODYEAR TIRE & RUBBER COMPANY, OF AKRON, OHIO, A CORPORATION OF OHIO.

BELT AND THE LIKE.

Application filed August 28, 1918. Serial No. 251,759.

*To all whom it may concern:*

Be it known that I, WARREN K. LEWIS, a citizen of the United States, and resident of Newton, Massachusetts, have invented certain new and useful Improvements in Belts and the like, of which the following is a specification.

My present invention relates to new and useful improvements in rubber belting and is generally applicable to belting of this character, whether it be of the transmission, conveyor or elevator type.

One of the principal objects of my invention is to so construct and prepare for incorporation into the belt, the fabric from which the belt is to be made, that the capacity of the belt for elongation in service (which is an objection urged against rubber belting of this class), will be brought to a substantially irreducible minimum.

Another important object of my invention is to so construct the belt that the bond between the plies of the fabric forming the body of the belt will be much improved.

The above and additional objects of a similar nature, which will be hereinafter more specifically treated, may be accomplished by such means as are described in the following specification illustrated in the accompanying drawing, and then more particularly pointed out in the claims which are appended hereto and form a part of this application.

In the drawing the figure represents a fragmentary perspective view partly in section of a portion of a belt embodying my invention.

The belt 2 of my present invention involves and depends largely for its merit upon the incorporation in its structure of two principal features, the first of which is the particular manner in which the fabric is woven, and the second of which is the particular material from which the fabric is made.

The fabric plies or sheets 3 from which the belt is made are loosely woven, being, in fact, so woven that interstices or reticulations 4 of appreciable size are comprehended between the weft and warp threads 5. Every ply of fabric from which the belt is made is thus loosely woven, and the advantages of the employing of this construction in the fabric is manifest and manifold.

In this connection it is first to be noted that when the fabric is subjected to the frictioning process (by which process the fabric is impregnated with rubber), the existence of the interstices makes possible a more thorough and intimate impregnation of the fabric sheet (considered as an entirety), than is possible in a closely woven fabric.

In the second place, the threads forming the fabric are themselves more thoroughly impregnated with the rubber, since there is less resistance offered by the threads in the loosely woven fabric to the forcing into and between their fibres of rubber by the calendering rolls than is the case with the threads in tightly woven fabric.

This is obviously true, for in the case of the tightly woven fabric the fibres are in intimate contact with each other, due to the packing of the threads, which results from the close weaving of the fabric.

The foregoing advantages are supplemented, however, in the use of my proposed belt fabric, by the further advantage that the presence of the interstices between the threads in each ply of fabric, composing the belt, makes it possible for a number of rivets 6 of rubber, extending through the several plies, to be formed in the belt during the vulcanization thereof. These rivets act to bind the several plies firmly and securely to each adjacent ply, thereby eliminating to a very large extent the liability of ply separation which is one of the most frequent causes of belt failure.

As previously stated, my invention consists not only in the particular manner in which the fabric plies are woven, and the manner in which the several plies are connected by rubber rivets as a result of the particular manner in which the fabric is woven, but also consists in the use of a material which has not heretofore been used in the art of belt making. The material in question is jute.

I have discovered by experimentation that the use of the jute fibre for making a belt fabric is possessed of many advantages. One of the principle advantages is that the impregnation with rubber of the separate threads forming the fabric is more thorough and complete than when cotton fibre is used. I attribute this to the fact that jute fibres are longer than cotton fibres and that resultantly, the thread, which is twisted from the jute fibre, need not be so tight, for it is not necessary to tightly twist a thread formed of long jute fibres as a thread made of short cotton fibres.

This fact that the threads, when made of the jute fibres need not be so tightly twisted, by which I mean that the fibres are not given so great a number of turns per unit of thread length, gains two additional advantages, the first of which is that the threads will not stretch so much (hence the capacity of the belt for elongation in service is materially and advantageously cut down) and the second is that the presence of the longer fibres (and I believe the accompanying presence of longer and larger cells in the fibres) makes it possible to more easily impregnate the fibre with rubber during the frictioning process.

Still another advantage resulting in my present construction jointly from the use of jute threads and the weaving of the fabric in an open or loose condition is that the threads may be more easily flattened when passing through the calendar rolls and as a consequence, the rubber may be more easily forced into the threads and the fibres thereof.

Still another advantage which makes for longer life and more efficient performance in service of my improved belt is the fact that a reduction in the capacity of the belt for stretching or elongation is further affected by making the fabric of an open weave. This obviously results from the fact that there are less intersections per running inch of the weft and filler threads and, therefore, the weft threads are, when incorporated into the belt, possessed of fewer humps or loops. In a large measure the presence of these loops or humps, formed by the intersection of the weft and warp threads in the cotton fabric belt, cause the elongation of the belt when it is put into use. It is also true that the humps or loops, formed in the weft threads by the intersections with the warp threads, are of less extent than in the case of close woven duck fabric or even by an open weave duck fabric, for as previously stated, the fact that the threads are made of jute, which need not be tightly twisted when the threads are made up, makes it possible for the threads to be flattened out in cross section during the frictioning process. This flattening out of the thread, of course, reduced the extent of the loops or humps formed at the intersection of the warp and weft threads.

What I claim is:

1. A new article of manufacture, consisting of a belt made of loosely woven jute fabric, and rubber material applied to the jute fabric.

2. A new article of manufacture, consisting of a belt made of a fabric comprising threads composed of jute fibres, and rubber material applied to the fabric.

3. A new article of manufacture, consisting of a belt made of a woven fabric with warp and weft threads composed of jute fibres, and rubber material applied to the fabric.

4. A new article of manufacture, consisting of a belt made of open weave fabric composed of jute, and rubber material applied to the fabric.

5. A new article of manufacture, consisting of a belt made of a loosely woven fabric having warp and weft threads of loosely twisted jute fibres, and rubber material applied to the fabric.

6. A new article of manufacture, consisting of a belt made of superposed plies of jute fabric, and rubber material applied to the jute fabric, said jute fabric being loosely woven so that rivets of rubber material extend through the meshes of the jute fabric and act as bonds through and between the plies of jute fabric.

7. As an article of manufacture, a belt comprising superposed plies of woven fabric formed of jute threads woven in spaced relation to form interstices of substantial size, the several plies being frictioned with rubber and said belt being vulcanized whereby rivets of rubber are produced extending through the thickness of the belt, to anchor the superposed plies together.

8. As an article of manufacture, a belt comprising superposed plies of material frictioned with rubber composition and vulcanized together, said plies comprising loosely twisted threads of jute fabric woven in spaced relation to provide interstices therebetween through which the rubber composition may percolate in rivet like formation during vulcanization.

In witness whereof, I have hereunto signed my name in the presence of two subscribing witnesses.

WARREN K. LEWIS.

Witnesses:
  A. H. LIDDERS,
  E. C. LEADENHAM.